US012706383B2

(12) United States Patent
Salah et al.

(10) Patent No.: US 12,706,383 B2
(45) Date of Patent: Aug. 11, 2026

(54) MULTI-LAYER PATCH ANTENNA DEVICE AND VEHICLE

(71) Applicant: Continental Automotive Technologies GmbH, Hannover (DE)

(72) Inventors: Abdo Salah, Munich (DE); Thomas Lankes, Rosenheim (DE)

(73) Assignee: AUMOVIO Germany GmbH, Frankfurt am Main (DE)

(*) Notice: Subject to any disclaimer, the term of this patent is extended or adjusted under 35 U.S.C. 154(b) by 0 days.

(21) Appl. No.: 18/726,322

(22) PCT Filed: Dec. 1, 2022

(86) PCT No.: PCT/DE2022/200282
§ 371 (c)(1),
(2) Date: Jul. 2, 2024

(87) PCT Pub. No.: WO2023/131375
PCT Pub. Date: Jul. 13, 2023

(65) Prior Publication Data

US 2025/0070466 A1 Feb. 27, 2025

(30) Foreign Application Priority Data

Jan. 4, 2022 (DE) ..................... 10 2022 200 018.8

(51) Int. Cl.
*H01Q 5/30* (2015.01)
*H01Q 9/04* (2006.01)
*H01Q 1/32* (2006.01)

(52) U.S. Cl.
CPC ............ *H01Q 5/30* (2015.01); *H01Q 9/0414* (2013.01); *H01Q 9/0421* (2013.01);
(Continued)

(58) Field of Classification Search
CPC ...... H01Q 5/30; H01Q 9/0414; H01Q 9/0421; H01Q 9/045; H01Q 9/0464; H01Q 1/3275; H01Q 5/40; H01Q 9/0435; H01Q 9/0457
See application file for complete search history.

(56) References Cited

U.S. PATENT DOCUMENTS 4,218,682 A * 8/1980 Frosch ..................... H01Q 5/40
343/700 MS
4,827,271 A * 5/1989 Berneking ............. H01Q 5/378
343/846
(Continued)

FOREIGN PATENT DOCUMENTS

CN 202363584 U 8/2012
CN 202363587 U 8/2012
(Continued)

OTHER PUBLICATIONS

E. Ghafari et al. "Single-pin, single-layer, dual-band patch antenna for global positioning system and satellite digital audio radio system automotive applications", IET Microwaves, Antennas & Propagation, 2014, vol. 8, Iss. 13, pp. 1066-1074. www.ietdl.org.
(Continued)

*Primary Examiner* — Dameon E Levi
*Assistant Examiner* — Jordan E. DeWitt

(57) ABSTRACT

The multi-layer patch antenna device comprises a lower antenna layer, a middle antenna layer and an upper antenna layer. An upper metal layer of the middle antenna layer is contacted by two feed pins which are guided through the lower and middle antenna layers. Metal layers of the lower antenna layer are connected to each other via a first hollow pin which is guided through the lower dielectric substrate layer. Metal layers of the middle antenna layer are connected via a second hollow pin which is guided through the middle dielectric substrate layer. An upper metal layer of the upper
(Continued)

antenna layer is contacted by a further feed pin which is guided through the antenna layers and is coaxially sheathed by the first hollow pin and the second hollow pin.

20 Claims, 8 Drawing Sheets

(52) U.S. Cl.
CPC ........... *H01Q 9/045* (2013.01); *H01Q 9/0464* (2013.01); *H01Q 1/3275* (2013.01)

(56) References Cited

U.S. PATENT DOCUMENTS

| | | | | |
|---|---|---|---|---|
| 5,519,406 | A * | 5/1996 | Tsukamoto | H01Q 13/10 343/770 |
| 5,940,037 | A | 8/1999 | Kellerman et al. | |
| 6,118,406 | A * | 9/2000 | Josypenko | H01Q 9/0414 343/700 MS |
| 6,329,959 | B1 * | 12/2001 | Varadan | H01Q 1/364 343/700 MS |
| 6,639,558 | B2 | 10/2003 | Kellerman et al. | |
| 6,850,191 | B1 * | 2/2005 | Thill | H01Q 5/40 343/700 MS |
| 7,253,770 | B2 | 8/2007 | Yegin et al. | |
| 7,528,780 | B2 | 5/2009 | Thiam et al. | |
| 8,232,924 | B2 * | 7/2012 | Bucca | H01Q 13/18 343/702 |
| 10,096,893 | B2 * | 10/2018 | Ameri | H01Q 9/0414 |
| 10,916,836 | B2 | 2/2021 | Thiam et al. | |
| 11,847,372 | B2 | 12/2023 | Aritomi | |
| 11,860,869 | B1 | 1/2024 | Hwang et al. | |
| 2003/0146872 | A1 | 8/2003 | Kellerman et al. | |
| 2004/0090369 | A1 * | 5/2004 | McCarrick | H01Q 9/0414 343/700 MS |
| 2004/0090370 | A1 * | 5/2004 | McCarrick | H01Q 21/0075 343/700 MS |
| 2005/0054317 | A1 * | 3/2005 | Ro | H01Q 9/0414 455/575.1 |
| 2005/0062651 | A1 * | 3/2005 | Dai | H01Q 9/0421 343/700 MS |
| 2005/0275590 | A1 * | 12/2005 | Eom | H01Q 1/22 343/700 MS |
| 2006/0097924 | A1 * | 5/2006 | Yegin | H01Q 5/40 343/700 MS |
| 2006/0220970 | A1 * | 10/2006 | Aminzadeh | H01Q 9/0407 343/700 MS |
| 2007/0126641 | A1 * | 6/2007 | Saily | H01Q 9/0407 343/700 MS |
| 2008/0068270 | A1 | 3/2008 | Thiam et al. | |
| 2008/0123246 | A1 * | 5/2008 | Park | H01G 4/1209 361/305 |
| 2008/0238793 | A1 * | 10/2008 | Channabasappa | H01Q 9/0457 343/767 |
| 2009/0058731 | A1 | 3/2009 | Geary et al. | |
| 2010/0001906 | A1 * | 1/2010 | Akkermans | H01Q 9/0457 343/770 |
| 2012/0212384 | A1 * | 8/2012 | Kam | H01Q 1/2283 343/834 |
| 2014/0145883 | A1 * | 5/2014 | Baks | H01Q 1/2283 343/700 MS |
| 2014/0361952 | A1 * | 12/2014 | Dobric | H01Q 21/00 343/893 |
| 2016/0092584 | A1 | 3/2016 | Nigam | |
| 2016/0172317 | A1 * | 6/2016 | Tsai | H10W 44/20 257/428 |
| 2016/0261047 | A1 * | 9/2016 | Wallace | H01Q 5/40 |
| 2017/0256848 | A1 * | 9/2017 | McGrath | H01Q 1/12 |
| 2018/0323502 | A1 * | 11/2018 | Lee | H05K 3/4697 |
| 2019/0237860 | A1 | 8/2019 | Thiam et al. | |
| 2019/0267697 | A1 * | 8/2019 | Quinlan | H01Q 1/36 |
| 2019/0267713 | A1 * | 8/2019 | Jeong | H01Q 9/065 |
| 2019/0393696 | A1 | 12/2019 | Tada et al. | |
| 2020/0021026 | A1 * | 1/2020 | Mitchell | H01Q 21/28 |
| 2020/0044326 | A1 * | 2/2020 | Olfert | H01Q 1/364 |
| 2020/0136257 | A1 * | 4/2020 | Hwang | H01Q 1/3275 |
| 2020/0303799 | A1 * | 9/2020 | Wang | H05K 1/0222 |
| 2021/0036427 | A1 * | 2/2021 | Hautcoeur | H01Q 9/0414 |
| 2021/0257737 | A1 * | 8/2021 | Yang | H01Q 1/38 |
| 2022/0052454 | A1 * | 2/2022 | Hasegawa | H01Q 9/045 |
| 2022/0166149 | A1 * | 5/2022 | So | H01Q 5/307 |
| 2022/0311142 | A1 * | 9/2022 | Hwang | H01Q 5/40 |
| 2022/0352636 | A1 * | 11/2022 | Yetisir | H04B 17/11 |
| 2024/0039161 | A1 * | 2/2024 | Park | H01Q 1/38 |
| 2024/0162617 | A1 * | 5/2024 | Batra | H01Q 9/0435 |
| 2024/0421489 | A1 * | 12/2024 | Chivukula | H01Q 21/065 |
| 2025/0070466 | A1 * | 2/2025 | Salah | H01Q 9/0464 |
| 2025/0226574 | A1 * | 7/2025 | Mohamed | H01Q 9/0414 |
| 2025/0329940 | A1 * | 10/2025 | Bai | H01Q 9/0414 |

FOREIGN PATENT DOCUMENTS

| | | | |
|---|---|---|---|
| CN | 103560320 | A | 2/2014 |
| CN | 204257815 | U | 4/2015 |
| CN | 106450729 | A | 2/2017 |
| CN | 106711605 | A | 5/2017 |
| CN | 206180103 | U | 5/2017 |

OTHER PUBLICATIONS

S. Caizzone "Miniaturized E5a/E1 Antenna Array for Robust GNSS Navigation", IEEE Antennas and Wireless Propagation Letters ( vol. 16), 2016, 4 pages, IEEE.

E. Ghafari and D. N. Aloi, "Single-pin dual-band patch antenna for GPS and SDARS applications," Proceedings of the 2012 IEEE International Symposium on Antennas and Propagation, Chicago, IL, USA, 2012, pp. 1-2, doi: 10.1109/APS.2012.6349149.

K. Phaebua, C. Phongcharoenpanich, D. Torrungrueng, N. Surittikul and W. Villarroel, "Dual-band antenna system for SDARS and GPS applications," 2010 IEEE Antennas and Propagation Society International Symposium, Toronto, ON, Canada, 2010, pp. 1-4, doi: 10.1109/APS.2010.5561019.

S. Chae, B. Ahn, T. Yeo and J. Yu, "An automotive stacked ceramic patch antenna with an integrated GNSS and SDARS antenna," 2017 International Symposium on Antennas and Propagation (ISAP), Phuket, Thailand, 2017, pp. 1-2, doi: 10.1109/ISANP.2017.8228802.

F. Mariottini, M. Albani, E. Toniolo, D. Amatori and S. Maci, "Design of a Compact GPS and SDARS Integrated Antenna for Automotive Applications," in IEEE Antennas and Wireless Propagation Letters, vol. 9, pp. 405-408, 2010, doi: 10.1109/LAWP.2010.2049632.

K. Geary, J. H. Schaffner, H. Hsu, H. J. Song, J. S. Colburn and E. Yasan, "Single Feed Dual-Band Stacked Patch Antenna for Orthogonal Circularly Polarized GPS and SDARS Applications," 2008 IEEE 68th Vehicular Technology Conference, Calgary, AB, Canada, 2008, pp. 1-5, doi: 10.1109/VETECF.2008.28.

Lai, Z., Yuan, J., Yang, X., Ye, Z., & Chen, W. (2014). Multiband probe-fed stacked patch antenna for GNSS applications. Progress in Electromagnetics Research Letters, 49(November), 131-135. https://doi.org/10.2528/PIERL14092803.

Ding, Kang, et al. "Stacked Tri-Band Circularly Polarized Microstrip Patch Antenna for CNSS Applications." Applied Mechanics and Materials, vol. 347-350, Trans Tech Publications, Ltd., Aug. 2013, pp. 1786-1789. Crossref, doi: 10.4028/www.scientific.net/amm.347-350.1786.

J. Li, H. Shi, H. Li and A. Zhang, "Quad-Band Probe-Fed Stacked Annular Patch Antenna for GNSS Applications," in IEEE Antennas and Wireless Propagation Letters, vol. 13, pp. 372-375, 2014, doi: 10.1109/LAWP.2014.2306442.

L. Li, Y. Huang, L. Zhou and F. Wang, "Triple-Band Antenna with Shorted Annular Ring for High-Precision GNSS Applications," in IEEE Antennas and Wireless Propagation Letters, vol. 15, pp. 942-945, 2016, doi: 10.1109/LAWP.2015.2482604.

O. P. Falade, M. U. Rehman, Y. Gao, X. Chen and C. G. Parini, "Single Feed Stacked Patch Circular Polarized Antenna for Triple

(56) References Cited

OTHER PUBLICATIONS

Band GPS Receivers," in IEEE Transactions on Antennas and Propagation, vol. 60, No. 10, pp. 4479-4484, Oct. 2012, doi: 10.1109/TAP.2012.2207354.
Z. Wang, S. Fang, S. Fu and S. Lu, "Dual-Band Probe-Fed Stacked Patch Antenna for GNSS Applications," in IEEE Antennas and Wireless Propagation Letters, vol. 8, pp. 100-103, 2009, doi: 10.1109/LAWP.2008.2012355.
Donghai Liu et al: "A Triple-band Circular Polarization Stacked Microstrip Antenna", Microwave, Antenna, Propagation and Emc Technologies for Wireless Communications, 2007 International Symposium On, IEEE, PI, Aug. 2007 (2007-08), Seiten 559-562, XP031167768, ISBN: 978-1-4244-1044-6 Zusammenfassung; Abbildung 1 Chapter: 2 . Antenna design.
Oluyemi P Falade et al: "Design of a compact multiband circularly polarized antenna for global navigation satellite systems and 5G/B5G applications", International Journal of RF and Microwave Computer-Aided Engineering, Wiley Interscience, Hoboken, USA, Bd. 30, Nr. 6, Feb. 17, 2020 (Feb. 17, 2020), Seite n/a, XP072010945, ISSN: 1096-4290, DOI: 10.1002/MMCE.22182 Zusammenfassung; Abbildung 1 Chapter: 2 . Antenna design.
M.M. Bilgic et al. "Modified Annular Ring Antenna for GPS and SDARS Automotive Applications," in IEEE Antennas and Wireless Propagation Letters, vol. 15, pp. 1442-1445, 2016, doi: 10.1109/LAWP.2015.2512558.
X. Zhanhg et al. "Gain-Enhanced Patch Antennas with Loading of Shorting Pins," in IEEE Transactions on Antennas and Propagation, vol. 64, No. 8, pp. 3310-3318, Aug. 2016.
Office Action dated Nov. 16, 2022 from corresponding German patent application No. 10 2022 200 018.8.
International Search Report and Written Opinion dated Feb. 27, 2023 from corresponding International patent application No. PCT/DE2022/200282.

* cited by examiner

MULTI-LAYER PATCH ANTENNA DEVICE AND VEHICLE

The invention relates to a multi-layer patch antenna device and to a vehicle having at least one multi-layer patch antenna device.

According to the prior art, ceramic patch antennas are increasingly being used in antenna devices for the provision of GNSS (Global Navigation Satellite Systems) and SDARS (Satellite Digital Audio Radio Systems) services, especially in the automotive sector. On account of the introduction of the 5G standard, it is necessary to integrate multiple antennas for satellite services into one another in order to provide space for new antennas for cellular mobile radio. There are only two possible ways of placing two different antennas in relation to each other: horizontally beside one another or vertically stacked on top of one another. Placing the GNSS and SADRS antennas beside one another is the most common solution, as is implemented in shark fin antennas, for example.

Multiple solutions for combining antennas have been disclosed in the prior art.

The publication M. M. Bilgic and K. Yegin, "Modified Annular Ring Antenna for GPS and SDARS Automotive Applications", in IEEE Antennas and Wireless Propagation Letters, vol. 15, pp. 1442-1445, 2016, discloses a combination of SDARS antennas and GNSS antennas in an antenna device, wherein the antenna for GNSS is designed as a patch antenna and the SDARS antenna is designed as a ring antenna or vice versa.

E. Ghafari and D. N. Aloi, "Single-pin dual-band patch antenna for GPS and SDARS applications," Proceedings of the 2012 IEEE International Symposium on Antennas and Propagation, Chicago, IL, USA, 2012, pp. 1-2, discloses a single-pin patch antenna comprising a central main patch antenna and a ring surrounding the central main patch antenna, both of which are designed with cut-off corners in order to achieve the desired circular polarization properties for GNSS and SDARS.

US 2009/0058731 A1 presents a stacked single patch antenna capable of simultaneously receiving both (RHCP) satellite signals in the GPS L1 frequency band and (LHCP) satellite signals in the SDARS frequency band.

U.S. Pat. No. 10,916,836 B2 presents a stacked patch antenna for GNSS and SDARS. A reflector is used here to improve the performance of the SDARS antenna.

U.S. Pat. No. 7,528,780 B2 presents a dual-pin stack patch antenna with optimized isolation between SDARS and GNSS. Isolation between the two feed pins is achieved by introducing the feed of an upper patch antenna in the middle of a lower patch antenna.

Most of the above-mentioned disclosures only include single-band GNSS antennas and SDARS antennas.

A stacked patch having multiple pins and an extended bandwidth for GNSS and SDARS is disclosed in CN 106711605 A. An upper patch antenna has two pins and receives RHCP for GNSS. A lower patch antenna for SDARS has a feed pin. The described vertically stacked GNSS-SDARS antennas include a single-band GNSS antenna and an SDARS antenna. There is no dual-/triple-band GNSS antenna with integrated SDARS.

For example, a triple-band stacked patch antenna for general applications is disclosed in the publication J. Li, H. Shi, H. Li and A. Zhang, "Quad-Band Probe-Fed Stacked Annular Patch Antenna for GNSS Applications", in IEEE Antennas and Wireless Propagation Letters, vol. 13, pp. 372-375, 2014. The antenna includes a stepped-radius shorting pillar to reduce a known inductance due to longer feed probes.

L. Li, Y. Huang, L. Zhou and F. Wang, "Triple-Band Antenna with Shorted Annular Ring for High-Precision GNSS Applications", in IEEE Antennas and Wireless Propagation Letters, vol. 15, pp. 942-945, 2016, describes a stacked circularly polarized triple-band patch antenna covering all GNSS bands. The antenna includes two shorted annular rings to improve mutual couplings.

CN 106450729 A proposes a design of a stacked, probe-fed multiband patch antenna for the BeiDou satellite navigation system (BDS) and GPS applications. The antenna covers the frequency bands BDS-1 L (1616±5 MHz), BDS-1 S (2492±5 MHz LHCP), BDS-2 B1 (1561±5 MHz) and GPS L1 (1575±5 MHz). High port isolation and circularly polarized power are achieved by the introduction of four metallized holes arranged symmetrically around the center of the patch antenna.

O. P. Falade, M. U. Rehman, Y. Gao, X. Chen and C. G. Parini, "Single Feed Stacked Patch Circular Polarized Antenna for Triple Band GPS Receivers", in IEEE Transactions on Antennas and Propagation, vol. 60, no. 10, pp. 4479-4484, Oct. 2012, presents a stacked patch antenna with an infeed for triple-band GPS receivers. A stacked triple-band circularly polarized six-port patch antenna for GNSS applications is presented in Ding, Kang, et al. "Stacked Tri-Band Circularly Polarized Microstrip Patch Antenna for CNSS Applications." Applied Mechanics and Materials, vol. 347-350, Trans Tech Publications, Ltd., Aug. 2013, pp. 1786-1789.

CN 103560320 A presents a triple-band antenna for BeiDou applications with concentric rings, which is fed via three slots.

Another general solution for multi-band applications, where multiple stacked patches and a substrate-integrated coaxial infeed are used to achieve high isolation between the bands, is disclosed in U.S. Pat. No. 6,639,558 B2.

It is an object of the invention to provide a space-saving antenna device which is intended for operation in three band ranges.

A first aspect of the invention relates to a multi-layer patch antenna device. It is provided that the multi-layer patch antenna device comprises a lower antenna layer, a middle antenna layer and an upper antenna layer, wherein the antenna layers are arranged in a predetermined installation position in a manner stacked on top of each other from the bottom to the top. In other words, it is a multi-layer antenna device, wherein multiple patch antennas are arranged in a manner stacked on top of each other. When the multi-layer patch antenna device is arranged in the predetermined installation position, the middle antenna layer is arranged on the lower antenna layer and the upper antenna layer is on the middle antenna layer.

The antenna layers comprise respective dielectric substrate layers, wherein an underside of the respective dielectric substrate layers is coated with a lower metal layer. A top side of the respective dielectric substrate layers is coated with an upper metal layer. In other words, a respective antenna layer comprises a dielectric substrate layer coated on both sides. In this case, a top side of the respective dielectric substrate layer may be coated at least in some areas with an upper metal layer and a lower side of the electric substrate layer may be coated at least in some areas with a lower metal layer.

It is provided that the upper metal layer of the middle antenna layer is contacted by two feed pins which are guided through the lower and middle antenna layers. In other words, the antenna device has the at least two feed pins. The feed pins are guided through the lower and middle antenna layers. The two feed pins thus run through the lower metal layer of the lower antenna layer, the substrate layer of the lower antenna layer, the upper metal layer of the lower antenna layer, the lower metal layer of the middle antenna layer, the substrate layer of the middle antenna layer and are arranged with feed points on the upper metal layer of the middle antenna layer. The two feed pins are electrically separated from the other metal layers. The metal layers of the lower antenna layer are connected to each other via a first hollow pin. The first hollow pin is guided through the lower dielectric substrate layer. In other words, the lower metal layer of the lower dielectric substrate layer is electrically conductively connected to the upper metal layer of the lower dielectric substrate layer via the first hollow pin.

The metal layers of the middle antenna layer are connected via a second hollow pin which is guided through the middle dielectric substrate layer. In other words, the upper metal layer of the middle antenna layer is electrically conductively connected to the lower metal layer of the middle antenna layer via the second hollow pin.

The upper metal layer of the upper antenna layer is contacted by a further feed pin which is guided through the antenna layers in the antenna device and is coaxially sheathed by the first hollow pin and the second hollow pin. In other words, the upper metal layer of the upper antenna layer has a feed point at which the further feed pin contacts the upper metal layer of the upper antenna layer. The further feed pin runs through the upper antenna layer, the middle antenna layer and the lower antenna layer. It is provided that the further feed pin is sheathed in the first antenna layer by the first hollow pin and is sheathed in the middle antenna layer by the second hollow pin.

The invention also includes developments that result in further advantages.

One development of the invention provides for the first hollow pin, the second hollow pin and the further feed pin to be guided through an area center of the patch antenna device. In other words, it is provided that the first hollow pin, the second hollow pin and the further feed pin run along a common axis which runs through a common center of the patch antenna device. In other words, it is provided that the feed point of the upper metal layer of the upper antenna layer, the hollow pin of the lower antenna layer and the hollow pin of the middle antenna layer are arranged on the axis running through the area center.

One development of the invention provides for the two feed pins to contact the upper metal layer of the middle antenna layer via capacitive connections. In other words, it is provided that the two feed pins are capacitively coupled to the upper metal layer of the middle antenna layer. The connection can be provided, for example, via so-called capacitive slots which can separate the feed points of the two feed pins from the metal layer.

One development of the invention provides for the upper metal layer of the upper antenna layer to comprise a rectangular basic structure, wherein two diagonally opposite corners of the rectangular structure are beveled. In other words, the upper metal layer of the upper antenna layer has a basic structure which is substantially rectangular, wherein the two of the corners which are arranged diagonally opposite each other have a respective bevel. The development results in the advantage that circularly polarized electromagnetic waves can be received through the upper metal layer of the upper antenna layer.

One development of the invention provides for the metal layers of the upper antenna layer to be electrically conductively connected to each other via four shorting pins which are guided through the upper dielectric substrate layer. In other words, it is provided that the upper metal layer of the upper antenna layer is electrically conductively connected to the lower metal layer of the upper antenna layer by way of the four shorting pins.

One development of the invention provides for the upper metal layer of the upper antenna layer to have a U-shaped slot which is arranged around a feed location of the upper metal layer of the upper antenna layer, at which the further feed pin contacts the upper metal layer of the upper antenna layer. This results in the advantage that an impedance of the upper antenna layer can be adjusted by the slot shape. The upper metal layer of the upper antenna layer can thus be formed as a patch antenna which can form a U-shaped trench which is not coated by a metal.

One development of the invention provides for the dielectric substrate layer of the upper antenna layer to have two cutouts which are arranged opposite feed points of the upper metal layer of the middle antenna layer, at which the feed pins contact the upper metal layer of the middle antenna layers. In other words, the dielectric substrate layer of the upper antenna layer forms the two cutouts which at least partially accommodate the feed points of the upper metal layer of the middle antenna layer. The cutouts may be arranged opposite the feed points of the upper metal layer of the middle antenna layer in order to compensate for an elevation of the feed points from the upper metal layer of the middle antenna layer. This results in the advantage that an elevation at the feed points, which can be present, for example, due to a tin application, can be received by the two cutouts. This results in the advantage that there is no need to provide an increased distance between the two antenna layers.

A second aspect of the invention relates to a multi-layer patch antenna device. It is provided that the multi-layer patch antenna device comprises a lower antenna layer, a middle antenna layer and an upper antenna layer, wherein the antenna layers are arranged in a predetermined installation position in a manner stacked on top of each other from the bottom to the top. In other words, it is a multi-layer antenna device, wherein multiple patch antennas are arranged in a manner stacked on top of each other. When the multi-layer patch antenna device is arranged in the predetermined installation position, the middle antenna layer is arranged on the lower antenna layer and the upper antenna layer is on the middle antenna layer.

The antenna layers comprise respective dielectric substrate layers, wherein an underside of the respective dielectric substrate layers is coated with a lower metal layer. A top side of the respective dielectric substrate layers is coated with an upper metal layer. In other words, a respective antenna layer comprises a dielectric substrate layer coated on both sides. In this case, a top side of the respective dielectric substrate layer may be coated at least in some areas with an upper metal layer and a lower side of the electric substrate layer may be coated at least in some areas with a lower metal layer.

It is provided that the upper metal layer of the middle antenna layer is contacted by two feed pins which are guided through the lower and middle antenna layers. In other words, the antenna device has the at least two feed pins. The feed pins are guided through the lower and middle antenna layers. The two feed pins thus run through the lower metal layer of the lower antenna layer, the substrate layer of the lower antenna layer, the upper metal layer of the lower antenna layer, the lower metal layer of the middle antenna layer, the substrate layer of the middle antenna layer and are arranged with feed points on the upper metal layer of the middle antenna layer. The two feed pins are electrically separated from the other metal layers. The metal layers of the lower antenna layer are connected to each other via a first hollow pin. The first hollow pin is guided through the lower dielectric substrate layer. In other words, the lower metal layer of the lower dielectric substrate layer is electrically conductively connected to the upper metal layer of the lower dielectric substrate layer via the first hollow pin.

The metal layers of the middle antenna layer are connected via a second hollow pin which is guided through the middle dielectric substrate layer. In other words, the upper metal layer of the middle antenna layer is electrically conductively connected to the lower metal layer of the middle antenna layer via the second hollow pin.

The metal layers of the upper antenna layer are connected via shorting pins which are guided through the dielectric substrate layer of the upper antenna layer. In other words, the upper metal layer of the upper antenna layer is electrically conductively connected to the lower metal layer of the upper antenna layer via the shorting pins.

The upper metal layer of the upper antenna layer is contacted by a further feed pin which is guided through the antenna layers in the antenna device and is coaxially sheathed by the first hollow pin and the second hollow pin. In other words, the upper metal layer of the upper antenna layer has a feed point at which the further feed pin contacts the upper metal layer of the upper antenna layer. The further feed pin runs through the upper antenna layer, the middle antenna layer and the lower antenna layer. It is provided that the further feed pin is sheathed in the lower antenna layer by the first hollow pin and is sheathed in the middle antenna layer by the second hollow pin.

One development of the invention provides for the dielectric substrate layers to have the same dielectric constant. In other words, it is provided that each of the dielectric substrate layers has a material of the same dielectric constant.

One development of the invention provides for the upper metal layer of the upper antenna layer to have a feed structure which is configured to conduct a signal from a contact point of the upper metal layer of the upper antenna layer with the further feed pin into a ring antenna structure of the upper metal layer of the upper antenna layer in two directions in a manner phase-shifted with respect to each other. In other words, the upper metal layer of the upper antenna layer has the ring antenna structure, wherein the ring antenna structure encloses the feed structure in which the feed point is located. The feed structure has two feed paths that connect the feed point to the ring antenna structure. The two feed paths provide paths of different lengths to route a signal from and/or to the feed point. Thus, a signal of the first feed path may have a different phase angle than a signal of the second feed path.

One development of the invention provides for the dielectric substrate layers to have different dielectric constants. In other words, it is provided that the dielectric constants of the substrate layers differ from each other.

One development of the invention provides for the ring antenna structure of the upper metal layer of the upper antenna layer to have two diagonally opposite beveled corners. In other words, the ring antenna structure has two diagonally opposite corners that are not beveled and two diagonally opposite corners that are beveled.

A third aspect of the invention relates to a vehicle comprising at least one multi-layer patch antenna device. The multi-layer patch antenna device may be arranged, for example, in an antenna housing of the vehicle, which can be designed as an outer shell of the vehicle or as a shark fin housing.

The invention also includes developments of the vehicle according to the invention which have features as have already been described in connection with the developments of the patch antenna device according to the invention. For this reason, the corresponding developments of the vehicle according to the invention are not described here again.

The invention also includes the combinations of the features of the embodiments described.

An exemplary embodiment of the invention is described below. In this respect:

The exemplary embodiment explained below is a preferred embodiment of the invention. In the exemplary embodiment, the described components of the embodiment each represent individual features of the invention that should be considered independently of one another and that each also develop the invention independently of one another and can therefore also be considered to be part of the invention individually or in a combination other than that shown. Furthermore, the embodiment described may also be supplemented by further features of the invention that have already been described.

In the figures, elements with the same function are each provided with the same reference signs.

Figure 1:
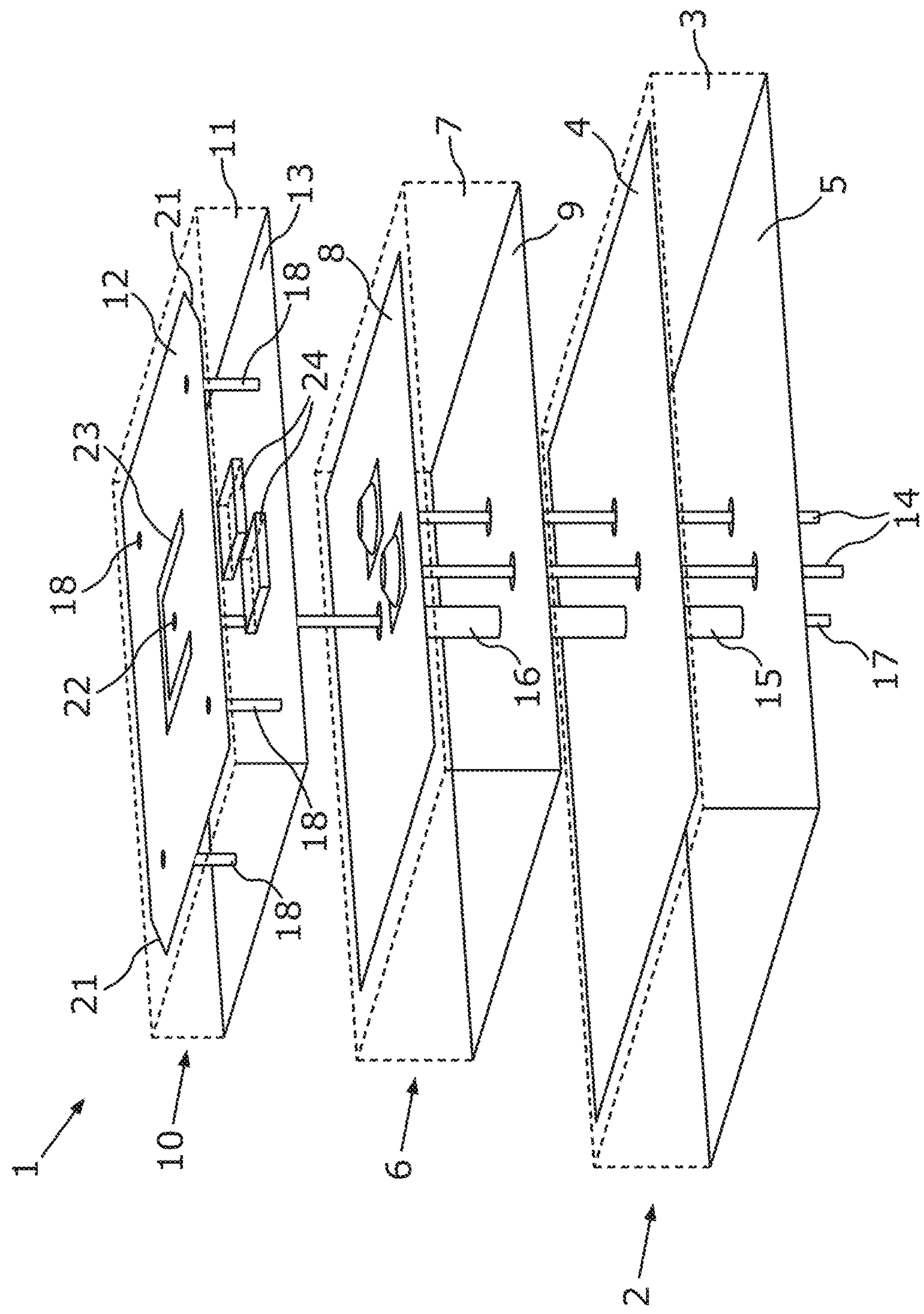
FIG. 1 shows a schematic exploded representation of a multi-layer patch antenna device.

FIG. 1 shows a schematic exploded representation of a multi-layer patch antenna device. The multi-layer patch antenna device 1 may have, in a predetermined installation position, a lower antenna layer 2 which may comprise a substrate layer 3. The substrate layer 3 of the lower antenna layer 2 may have an upper metal layer 4 on a top side and may have a lower metal layer 5 on its underside. On the lower antenna layer 2, there may be arranged a middle antenna layer 6 which can comprise a substrate layer 7. The substrate layer 7 of the middle antenna layer 6 may have an upper metal layer 8 on its top side and may have a lower metal layer 9 on its underside. Above the middle antenna layer 6, there may be arranged an upper antenna layer 10 which may comprise a substrate layer 11. The substrate layer 11 of the upper antenna layer 10 may have an upper metal layer 12 on its top side and may have a lower metal layer 13 on its underside. The multi-layer patch antenna device 1 can thus comprise the three antenna layers 2, 6, 10 arranged on top of each other. The lower antenna layer 2 may have a first hollow pin 15 which can run through the substrate layer 3 of the lower antenna layer 2 and electrically conductively connects the upper metal layer 4 of the lower antenna layer 2 to the lower metal layer 5 of the lower antenna layer 2. The first hollow pin 15 may be arranged in an area center of the patch antenna device 1 in the substrate layer 3 of the lower antenna layer 2. The middle antenna layer 6 may have a second hollow pin 16 which can run through the substrate layer 7 of the middle antenna layer 6 and electrically conductively connects the upper metal layer 8 of the middle antenna layer 6 to the lower metal layer 9 of the middle antenna layer 6. The second hollow pin 16 can be arranged in an area center of the substrate layer 7 of the middle antenna layer 6. The area center of the substrate layer 3 of the lower antenna layer 2, the area center of the substrate layer 7 of the middle antenna layer 6 and an area center of the substrate layer 11 of the upper antenna layer 10 can be arranged above one another in the installation position and can be identical to the area center of the patch antenna device 1, with the result that the first hollow pin 15 and the second hollow pin 16 can be arranged in series along a common axis. The upper antenna layer 10 may have shorting pins 18 which can run through the substrate layer 11 of the upper antenna layer 10. The shorting pins 18 can electrically conductively connect the upper metal layer 12 of the upper antenna layer 10 to the lower metal layer 13 of the upper antenna layer 10. For example, these may be four of the shorting pins 18.

The patch antenna device 1 may have feed pins 14 which may run through the lower metal layer 5 of the lower antenna layer 2, the substrate layer 3 of the lower antenna layer 2, the upper metal layer 4 of the lower antenna layer 2, the lower metal layer 9 of the middle antenna layer 6 and the substrate layer 7 of the middle antenna layer 6. The feed pins 14 may have capacitive connections 20 to the upper metal layer 8 of the middle antenna layer 6 at feed points 19 of the upper metal layer 8 of the middle antenna layer 6. The feed pins 14 can be arranged in a manner electrically insulated from the lower metal layer 9 of the middle antenna layer 6, the upper metal layer 4 of the lower antenna layer 2 and the lower metal layer 5 of the lower antenna layer 2. The upper metal layer 12 of the upper antenna layer 10 can be contacted by a further feed pin 17 which can run through the area center of the patch antenna device 1. The further feed pin 17 can be coaxially sheathed in the lower antenna layer 2 by the first hollow pin 15 and in the middle antenna layer 6 by the second hollow pin 16. The contact pin 17 may be insulated from the lower metal layer 13 of the upper antenna layer 10, may run through the substrate layer 11 of the upper antenna layer 10 and may contact the upper metal layer 12 of the upper antenna layer 10 at a feed point 22.

The feed point 22 of the upper metal layer 12 of the upper antenna layer 10 can be partially enclosed by a U-shaped slot 23. The upper metal layer 12 of the upper antenna layer 10 may have a substantially square shape which can have bevels 21 at two diagonally opposite corners. The dielectric constants of the substrate layers 3, 7, 11 can be identical or can differ from one another. Opposite the feed points 19 of the upper metal layer 8 of the middle antenna layer 6, cutouts 24 can be formed through the lower metal layer 13 of the upper antenna layer 10 and the substrate layer 11 of the upper antenna layer 10, which cutouts can accommodate the feed points 19 of the upper metal layer 8 of the middle antenna layer 6.

The substrate layers 3, 7, 11 of the antenna device 1 may preferably comprise a ceramic material and/or other materials. The dielectric constant can be selected depending on the requirements and can be, for example, 8 or more. The lower antenna layer 2 is designed, for example, to receive clockwise-rotating, circularly polarized satellite signals in the range 1164 MHz-1254 GHz with GPS L2/L5 or Galileo E5a/E5b or Glonass G3/G2 or BeiDou B2a or a combination thereof. The middle antenna layer 6 is designed, for example, to receive clockwise-rotating, circularly polarized satellite signals in the range 1525 MHz-1610 GHz, which contain the correction signals PPP, GPS L1, Galileo E1/E2, Glonass G1 and BeiDou B1C/B1i. The upper antenna layer 10 is designed, for example, to receive anticlockwise-rotating, circularly polarized satellite signals or a clockwise-rotating, circularly polarized signal in the range 2320-2345 MHz.

The lower antenna layer 2 and the middle antenna layer 6 can be fed by means of a simple double-probe feed with two feed pins 14 which are loaded with a capacitive load on the upper metal layer 8 of the middle antenna layer 6 in order to increase the bandwidth and compensate for the inductance of the long feed pins 14. The two feed pins 14 pass through two holes in the lower antenna layer 2 and directly feed the middle antenna layer 6, with the result that the lower antenna layer 2 is electromagnetically coupled to the middle antenna layer 6. The upper antenna layer 10 for SDARS is fed via a coaxial feed structure with a feed pin 17 which is guided through a metallic hole or a via in the area center of the lower antenna layer 2 and the middle antenna layer 6. Since the feed point 22 of the upper antenna layer 10, at which the inner conductor of the coaxial line contacts the upper metal layer 12 of the upper antenna layer 10, is located in the center of the upper antenna layer 10, it is difficult to tune the antenna layer 10 to 50 ohms at this point. To solve this problem, a U-shaped slot 23 is inserted in the upper antenna layer 10 in order to increase the antenna impedance and facilitate the tuning of the antenna to 50 ohms. This feed method has no influence on the resonant frequencies of the lower two antenna layers 2, 6, achieves very good isolation between SDARS and GNSS and requires no enlargement of the antenna device 1. In order to avoid a deterioration in the radiation pattern of the SDARS patch antenna, the upper antenna layer 10 may be loaded with four shorting pins 18. The shorting pins 18 act as an inductive load which increases the radiation area of the antenna layer 10 at the required frequency, which increases the gain of the antenna layer 10 and makes it possible to meet the required specifications of the SDARS service.

The proposed design of the antenna device 1 allows a powerful triple-band antenna. The antenna concept can be used to implement a stacked GNSS antenna and an SDARS antenna without affecting the performance of the SDARS antenna. The proposed design is very compact and easy to implement with the aid of a lean manufacturing process. The design achieves decoupling between SDARS and GNSS and between GNSS bands. The described approach can be used to implement a stacked triple-band patch antenna for GNSS signals and SDARS signals (Satellite Digital Audio Radio System).

FIG. 1 shows a schematic representation of the invention. The antenna device 1 may comprise the three dielectric substrate layers 3, 7, 11 composed of ordinary, inexpensive, ceramic dielectric. The top side of the lower dielectric substrate layer 3 may be provided for applying the upper metal layer 4 which can receive a first resonant frequency of the GNSS band, for example L2/L5. The upper metal layer 8 of the top side of the middle dielectric substrate layer 7 may be provided for receiving the second band of the GNSS signal, for example L1. The upper metal layer 12 on the top side of the upper dielectric substrate layer 11 may be provided for receiving the SDARS signal or the BeiDou S-band.

In order to implement an RHCP-GNSS antenna, it is possible to provide the two feed pins 14 which can be fed with a 90° phase shift. The feed pins 14 can be guided through the first dielectric substrate layer 3, through the upper metal layer 4 of the lower antenna layer 2 and through the dielectric substrate layer 7 of the middle antenna layer 6 and can make direct contact with the upper metal layer 8 of the middle antenna layer 6. The upper metal layer 4 of the lower antenna layer 2 may have two openings at the positions of the feed pins 14, with the result that there is no direct contact between the feed pins 14 and the upper metal layer 4 of the lower antenna layer 2. The lower metal layers 5, 9, 13 on the respective undersides of the dielectric substrate layers 3, 7, 11 of the antenna layers 2, 6, 10 can act as a small mass for upper metal layers 4, 8, 12, thus making it possible to minimize effects of the substrate thickness tolerances of the dielectric substrate layers 3, 7, 11. The lower metal layers 5, 9, 13 also have openings at the positions of the feed pins 14 for the GNSS antenna layer. The feed pins 14 can be connected to the upper metal layer 8 of the middle antenna layer 6 via capacitive slots 20. These capacitive slots 20 increase the bandwidth of the antenna and compensate for the inductive effect of the long feed pins 14. Since the upper metal layer 4 of the lower antenna layer 2 has no direct connections to the feed pins 14, it is electromagnetically coupled to the upper metal layer 8 of the middle antenna layer 6, which also increases the bandwidth. A further advantage of this feed mechanism is that there is no need to use any additional feed pins 14 for the upper metal layer 4 of the lower antenna layer 2, as is common in the prior art.

The upper metal layer 12 of the upper antenna layer 10, which can be provided for receiving the SDARS signal, is shown. In order to implement an LHCP antenna, the corners of the upper metal layer 12 of the upper antenna layer 10 can be designed as beveled corners 21. For feeding the SDARS antenna, it is possible to propose a coaxial feed structure which may comprise a metallic passage which may run through the area center of the dielectric substrate layer 3 of the lower antenna layer 2 and the area center of the dielectric substrate layer 7 of the middle antenna layer 6. The passage can comprise the hollow pin 15 of the lower antenna layer 2 and the hollow pin 16 of the middle antenna layer 6, wherein the hollow pin 15 of the lower antenna layer 2 can be in contact with the metal layers 4, 5 of the lower antenna layer 2 and the hollow pin 16 of the middle antenna layer 6 can be in contact with the metal layers 8, 9 of the middle antenna layer 6. Running in the center of the hollow pins 15, 16, which can also be vias, is the further feed pin 17 which can be in contact with the upper metal layer 12 of the upper antenna layer 10. Since the further feed pin 17 for the SDARS signal contacts the feed point 22 in the center of the upper metal layer 12 of the upper antenna layer 10, it is very difficult to tune the antenna to 50 ohms. In order to enable this tuning, the U-slot 23 can be incorporated in the upper metal layer 12 of the upper antenna layer 10 in order to tune the antenna to 50 ohms. The same feed concept for SDARS antennas has already been used in the prior art.

Theoretically, the stacking of many antenna layers above one another leads to a deterioration in the radiation pattern of the upper metal layer 12 of the upper antenna layer 10, especially at the zenith. This behavior can be explained using the array theory. The upper metal layer 12 of the upper antenna layer 10 can be replaced by two magnetic currents above a perfect conductor. The calculation of an array factor of this constellation shows that the radiation at the zenith is lower when the distance between the magnetic current and the PEC is greater. Due to this deterioration in the radiation pattern, it is not possible to meet the specification of the SDARS service with the described implementation according to the prior art.

In the present antenna device, four small metallic shorting pins 18 can be provided as an inductive load for the upper metal layer 12 of the upper antenna layer 10. Using the inductive loads increases the resonant frequency of the upper metal layer 12 of the upper antenna layer 10. In order to resonate the antenna at the SDARS frequency, the size of the upper metal layer 12 of the upper antenna layer 10 must be increased. Compared to the prior art, the gain at the zenith was increased by about 2 dB.

Normally, the making of the contact of the feed pins 14 on the upper metal layer 8 of the middle antenna layer 6 at the feed points 19 requires some solder joints which normally have a height of 0.8 mm. In the prior art, for this reason, a spacer must be used between the various dielectric substrate layers 7, 11, which increases the total height of the stacked antenna by 2 mm.

TABLE 1

Dimensions of a stacked L1/L5 SDARS patch according to the prior art and the proposed design.

| | Prior art | Proposed design |
|---|---|---|
| Total antenna height mm | 19 | 17 |
| L5 patch size mm | 47.5 | 43 |
| L1 patch size mm | 33 | 31 |
| SDARS patch size mm | 20 | 31 |
| Dielectric constant | 8 | 8 |

As can be seen in table 1, loading the lower patch with the metallic vias according to the prior art increases the patch size compared to the proposed design.

Figure 2:
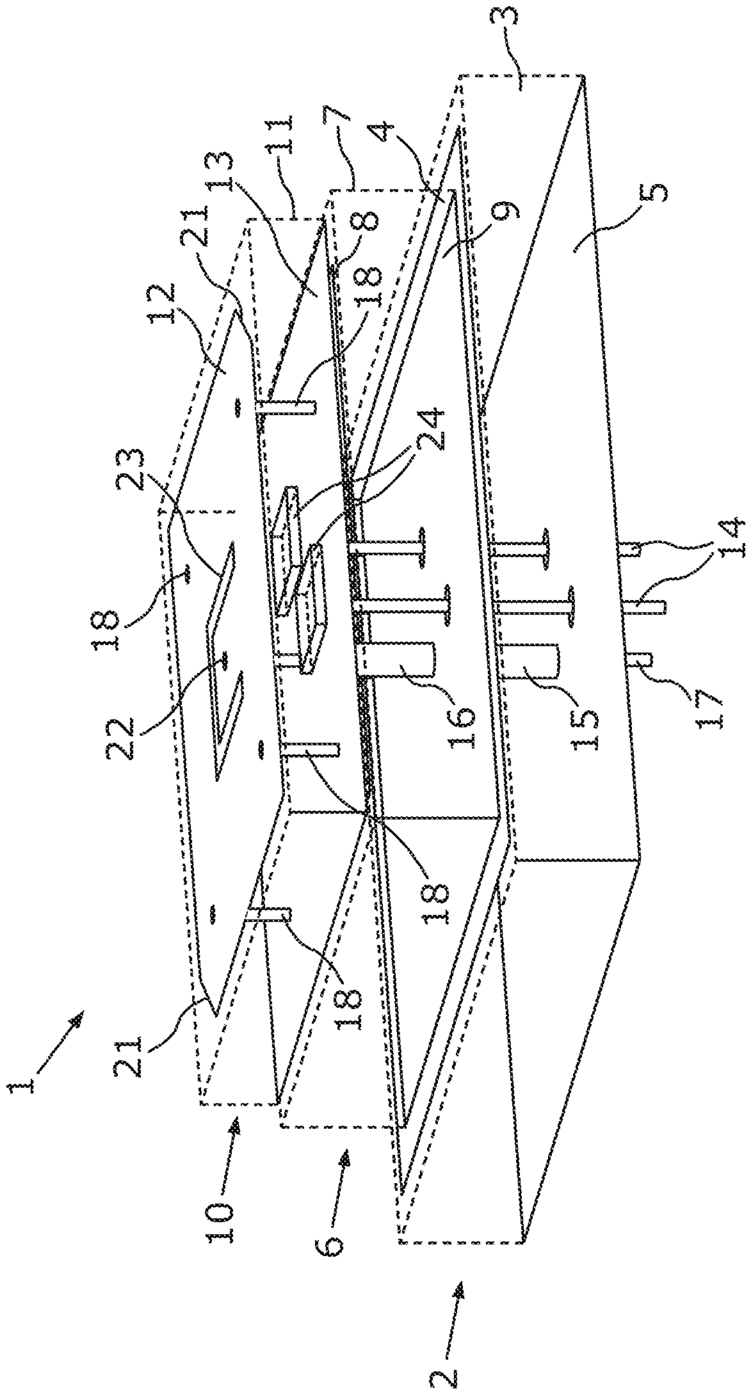
FIG. 2 shows a schematic representation of the antenna device shown in FIG. 1.

FIG. 2 shows a schematic representation of the antenna device shown in FIG. 1.

Figure 3:
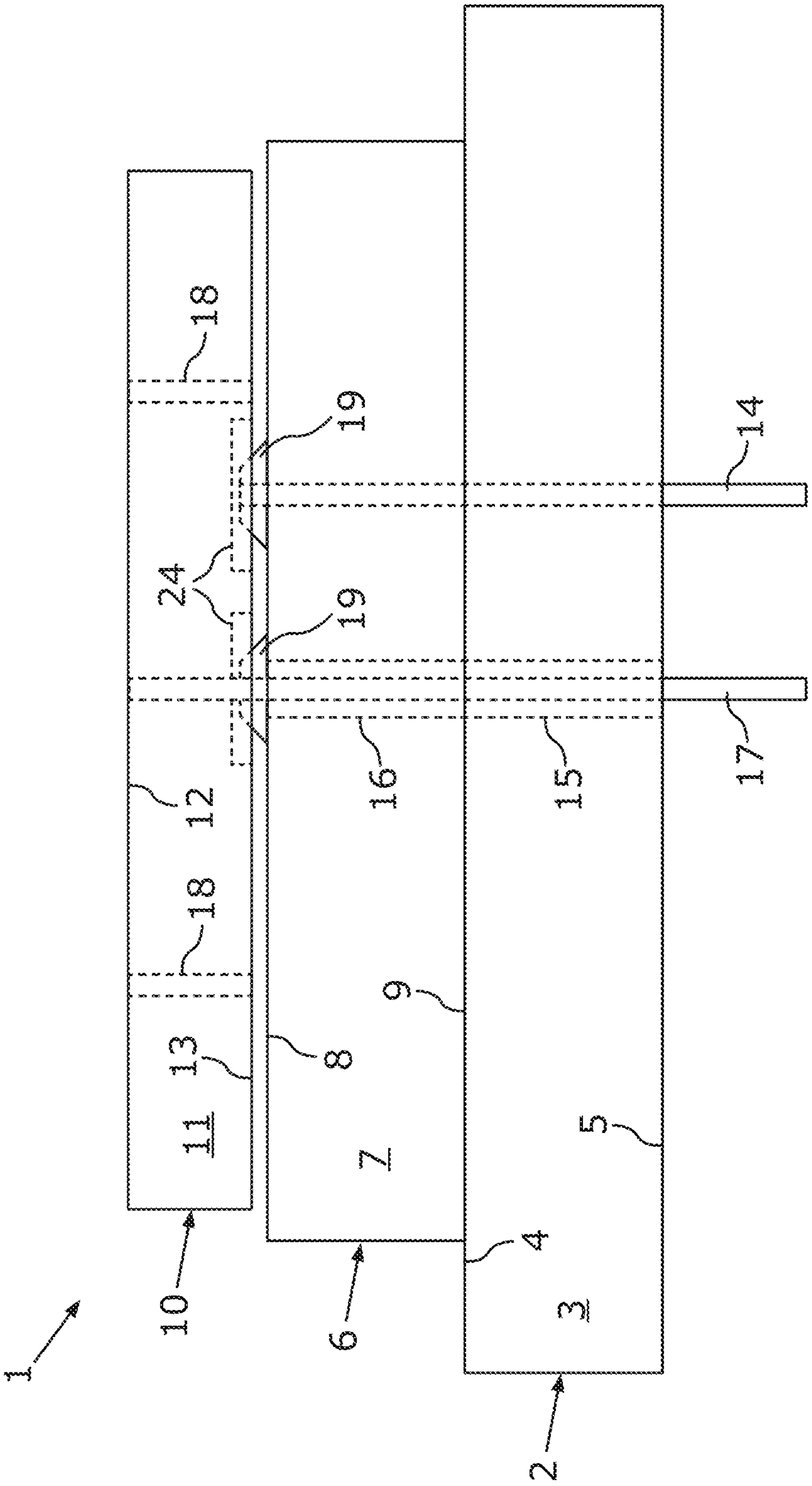
FIG. 3 shows a schematic side representation of the antenna device shown in FIG. 1.

FIG. 3 shows a schematic side representation of the antenna device shown in FIG. 1. The individual antenna layers 2, 6, 10 and the course of the hollow pins 15, 16 and the feed pins 14 can be seen.

Figure 4:
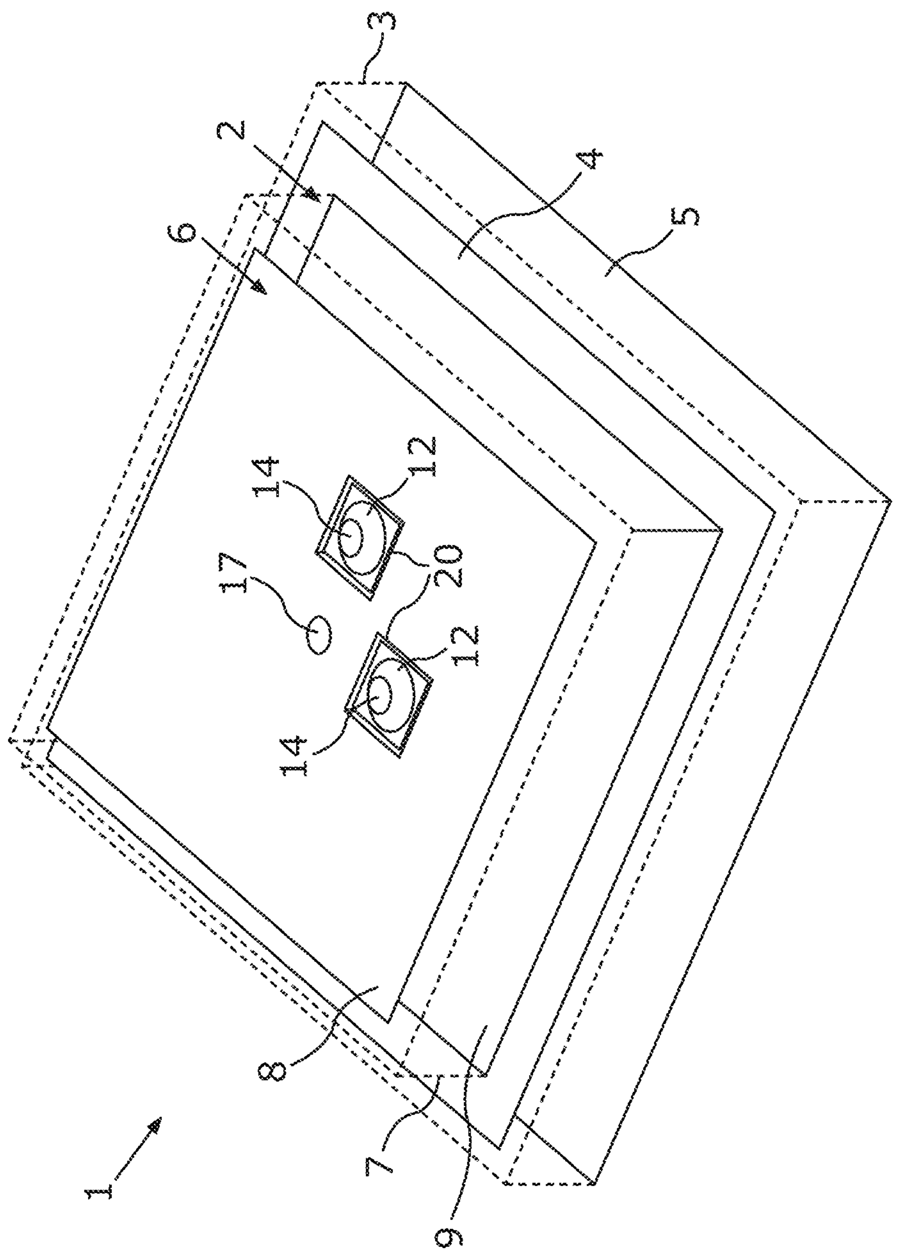
FIG. 4 shows a schematic representation of a lower antenna layer and a middle antenna layer.

FIG. 4 shows a schematic representation of a lower antenna layer and a middle antenna layer. Positions of the feed points 19 of the feed pins 14 of the upper metal layer 8 of the middle antenna layer 6 are shown. The hollow pin 16 running through the area center of the middle antenna layer 6 can be seen in the upper metal layer 8 of the middle antenna layer 6. The feed pin 17 of the upper antenna layer 10 can run coaxially along the same axis, wherein the feed pin 17 can be sheathed by the hollow pin 15 and the hollow pin 16.

Figure 5:
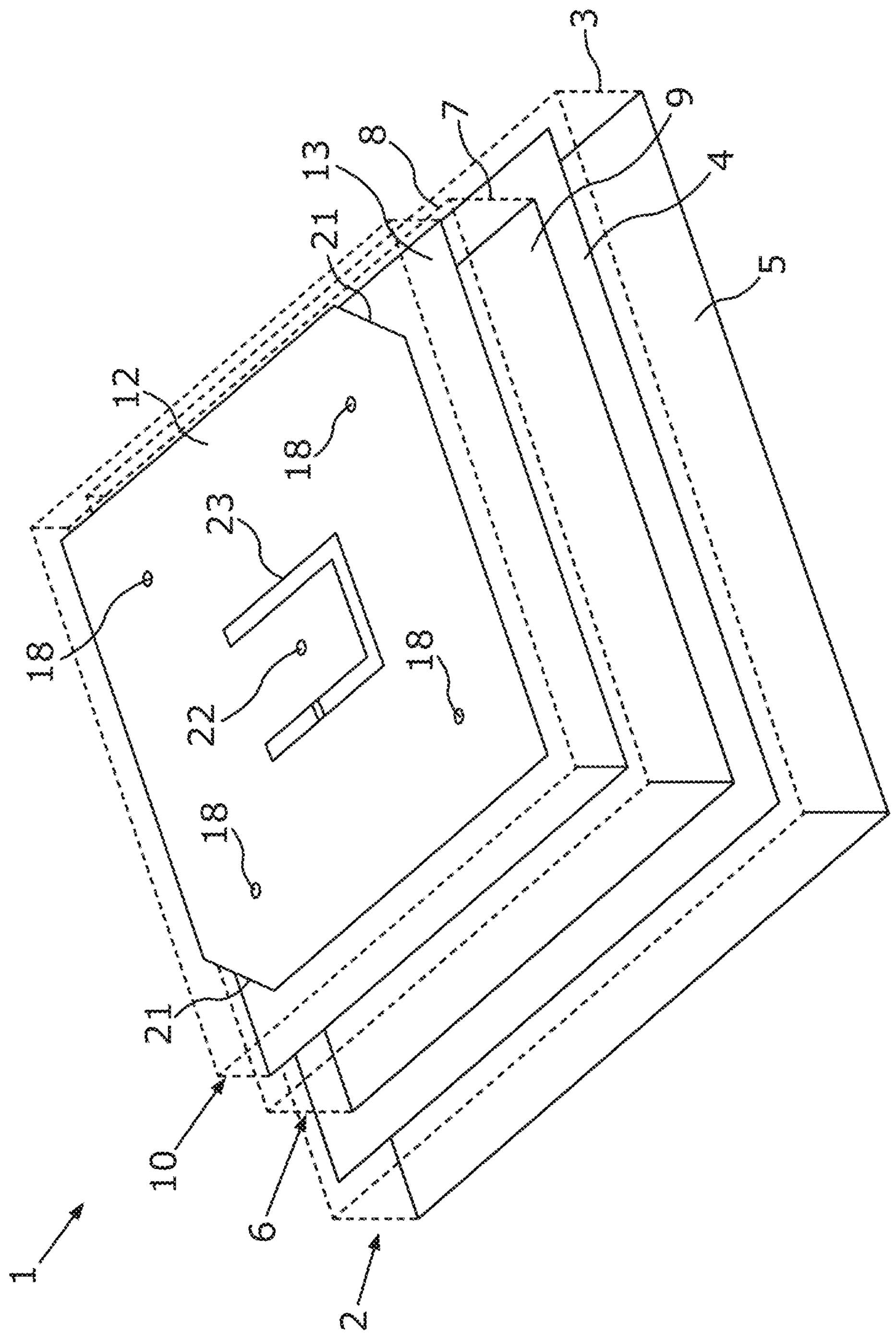
FIG. 5 shows a further schematic representation of an antenna device.

FIG. 5 shows a further schematic representation of an antenna device. The upper metal layer 12 of the upper antenna layer 10 with the U-shaped slot 23 and the beveled corners 21 is shown.

Figure 6:
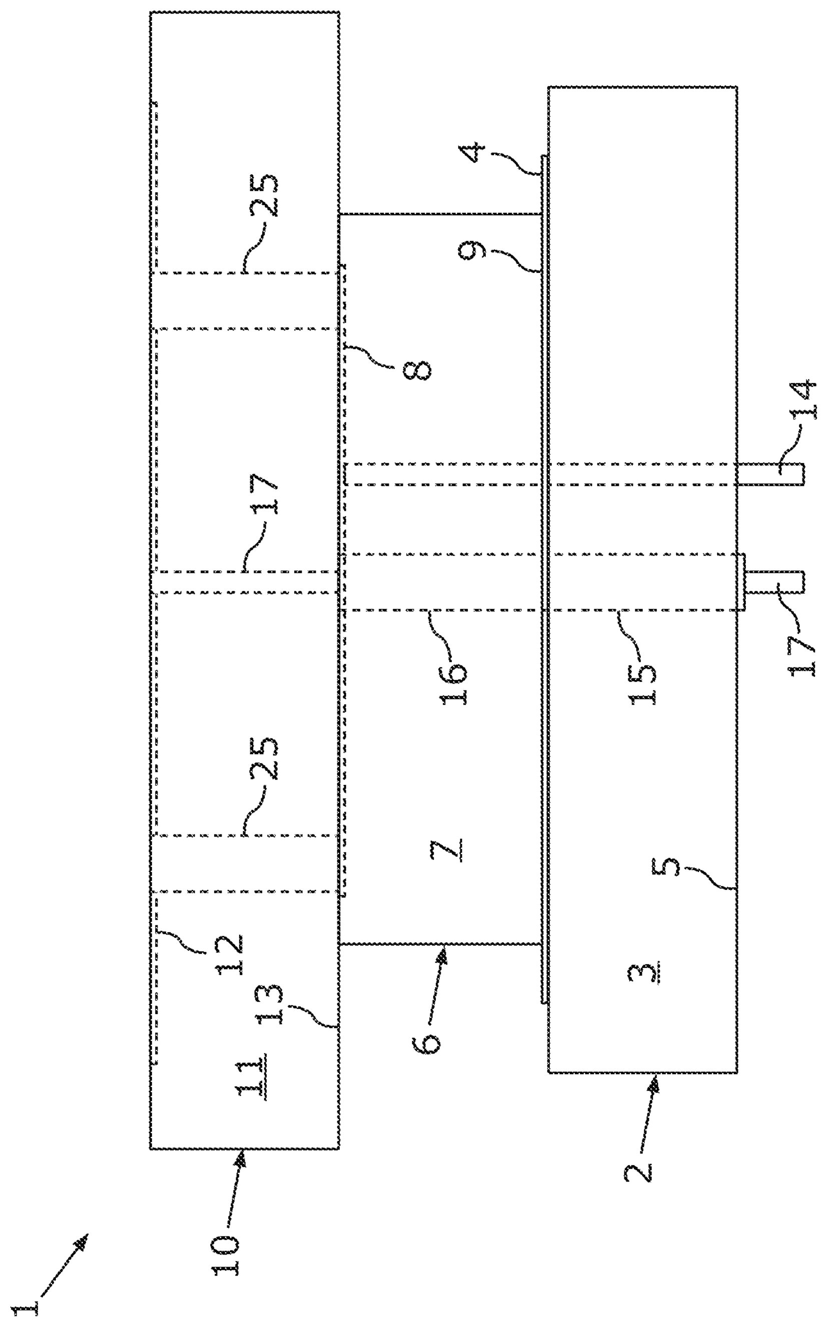
FIG. 6 shows a cross-sectional view of a schematic representation of an antenna device comprising a ring antenna structure.

FIG. 6 shows a cross-sectional view of a schematic representation of an antenna device. The upper antenna layer 10 can have four shorting pins 25 which are in the form of hollow pins and can electrically conductively connect the lower metal layer 13 of the upper antenna layer 10 to the upper metal layer 12 of the upper antenna layer 10. The feed pin 17 for feeding the upper metal layer 12 of the upper antenna layer 10 can run through the hollow pin 15 of the lower antenna layer 2 and the hollow pin 16 of the middle antenna layer 6. The dielectric constants of the substrate layers 3, 7, 11 of the antenna layers 2, 6, 10 can differ from one another or be identical.

Figure 7:
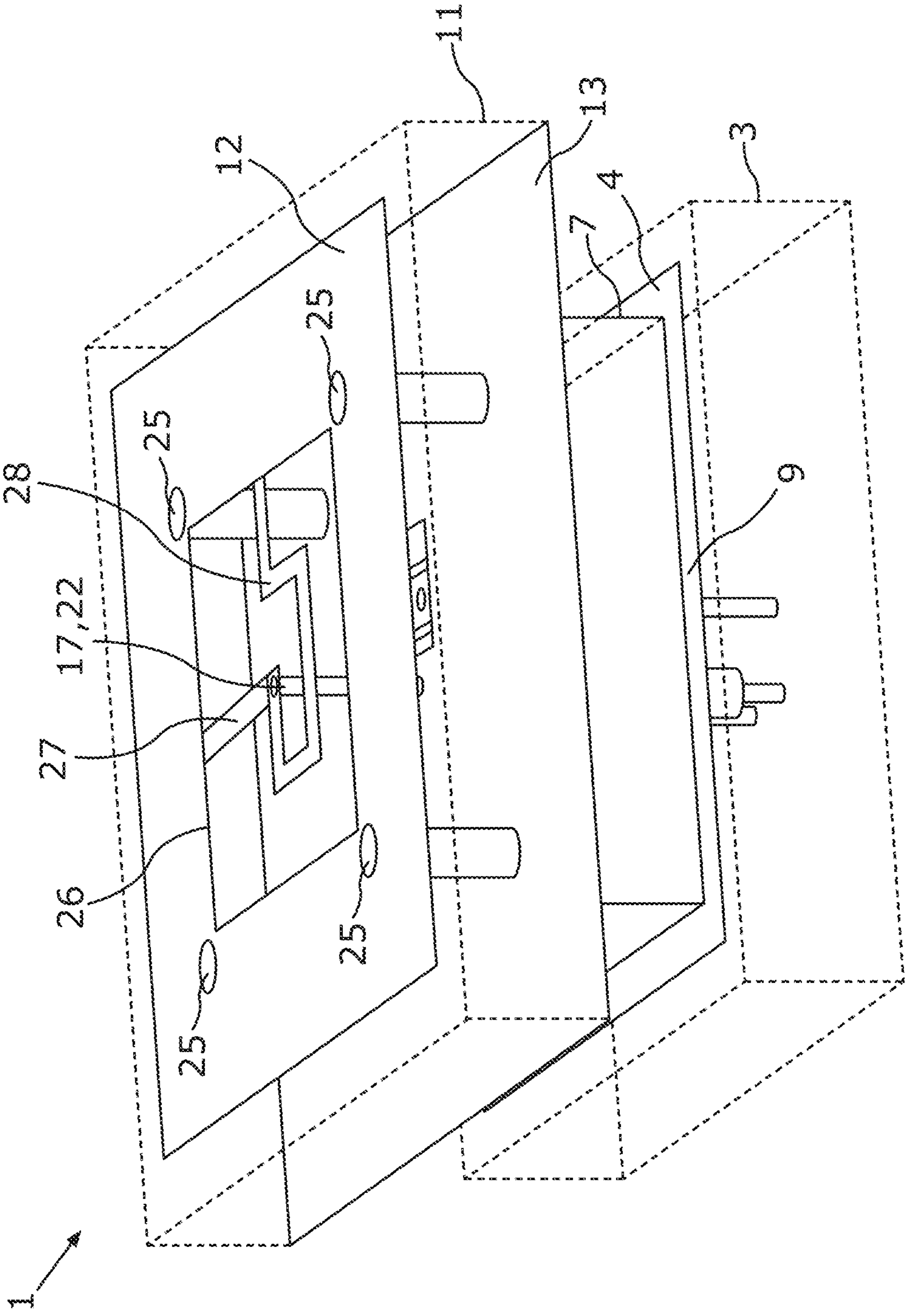
FIG. 7 shows a schematic representation of an antenna device comprising a ring antenna structure.

FIG. 7 shows a schematic representation of an antenna device. The feed point 22 of the upper metal layer 12 of the upper antenna layer 10 can be arranged in a feed structure 26 which can comprise two feed paths 27, 28. The two feed paths 27, 28 can be provided for providing two path lengths of different lengths in two different directions.

Whereas FIG. 1 to FIG. 5 show triple-stacked patches using materials of the same or different dielectric constants, FIG. 6 and FIG. 7 show a further possible way of implementing the upper metal layer 12 of the upper antenna layer 10 for SDARS with a ring antenna. Here, too, the ring antenna can be loaded with shorting pins 25 in order to increase the radiation range. In order to achieve circular polarization, it is possible to provide a feed structure 26 which can cause a phase shift between ring edges of the ring antenna. Circular polarization can also be achieved by beveled ring corners 21, as shown in FIG. 1.

Figure 8:
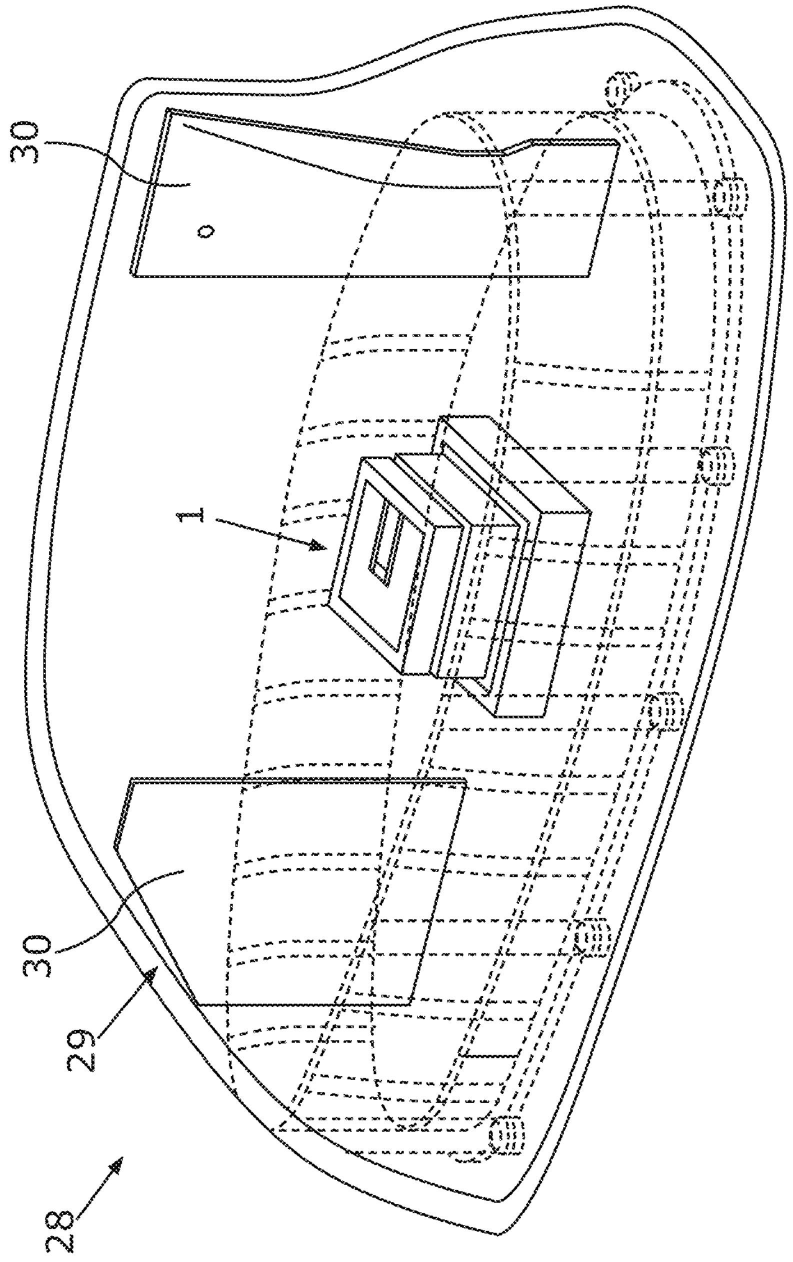
FIG. 8 shows a schematic representation of an antenna device in an antenna housing of a vehicle.

FIG. 8 shows a schematic representation of an antenna device in an antenna housing of a vehicle. The antenna housing 29 can be provided as a so-called shark fin housing for arrangement on a roof of the vehicle 28. In addition to the antenna device 1, further antennas can be arranged in the antenna housing 29. A common way of integrating two antennas for cellular mobile radio 30 with a dual-band GNSS antenna and an SDARS antenna provides for a side-by-side arrangement. This implementation requires more space in the shark fin, as the placement of the patch antennas in the immediate vicinity of the mobile radio antenna worsens the decoupling between the mobile radio antenna and the GNSS antenna or SADRS antenna. FIG. 8 shows the proposed design. The GNSS and SDARS antennas can be integrated above one another, saving space in the shark fin and improving the decoupling between the mobile radio antenna and GNSS antennas, since the distance between the cell antennas and the SDARS/GNSS antenna is now much greater. This also allows more antennas to be integrated into the shark fin.

The use of metallic vias in the prior art ensures good decoupling between GNSS band 1 and band 2, but also has a major effect on the decoupling between the feed pins, especially when using a substrate with a high dielectric constant. The deterioration in the decoupling leads to a deterioration in an axial ratio in the prior art. The cause of the deterioration in the decoupling between the feed pins is the immediate proximity of metallic vias in the dielectric substrate layer of the lower antenna layer to the feed pins. In contrast to the prior art, there is no need to use metallic bushings in the antenna device.

The prior art in which a stacked patch concept is used can be divided into four categories, with each category having specific disadvantages.

Multiple Pin Single Band GNSS and SDARS Stacked Patch: Only single-band GNSS combined with SDARS stacked patch, as in U.S. Pat. No. 10,916,836 B2, whereas the invention comprises a dual-/triple-band GNSS antenna combined with an SDARS antenna.

Single-pin stacked patch, as disclosed in US 2009/0058731 A1. The use of a single-pin feed for SDARS and GNSS requires a splitter in order to separate the GNSS signal from the SDARS signal, which usually causes some losses and a deterioration in the antenna gain; another disadvantage of the single-pin feed is the poor axial ratio over the bandwidth.

When using ring antennas for GNSS and SDARS or a combination of a patch antenna and a ring antenna, as in U.S. Pat. No. 7,253,770 B2, ring antennas or shortened ring antennas usually require more space (horizontally) than normal patch antennas if the same bandwidth is to be covered.

Stacked patch antenna with coaxial feed integrated into the substrate, as in CN 204257815 U.

This approach is the closest prior art to the antenna device. The concept behind this design is the use of three stacked patch antennas, with each patch being intended to cover a respective band. It is known that, as the height of the patch antenna increases, the inductance of the feed increases, resulting in a reduction in the bandwidth and a deterioration in the patch radiation pattern. Another problem related to using a stacked patch antenna is the decoupling between the ports. To overcome these problems, CN106450729 A, for example, uses a coaxial feed integrated into the substrate in the form of a metallic passage within the substrate, wherein the feed pins are guided through metallic holes. This concept has already been proposed in U.S. Pat. No. 6,639,558 B2. This feed method improves the decoupling between the ports and reduces the inductance of the feed pins, which increases the bandwidth. On the other hand, this method has some disadvantages: Firstly, loading the patch antenna with metallized holes (vias) increases the patch size, and, secondly, the use of many metallized holes makes the manufacturing process more difficult and more expensive. Using a separate feed for each patch antenna requires more vertical space for the heads of the feed pins; the last fundamental problem when using a stacked patch for GNSS and SDARS is the deterioration in the SDARS antenna pattern when the antenna is placed at the top. With this deterioration, it is not possible to meet the requirements for SDARS services. Loading the lower layer with metallic vias also worsens the coupling between the ports of the lower layer, especially when using a higher dielectric constant of around 20, for example. The deterioration in the decoupling between the lower patch ports has a significant effect on the axial ratio of the circular polarization.

Overall, the example shows how the antenna device can be used to provide a novel design of a single-feed triple-stacked patch antenna for triple-/dual-band GNSS and SDARS.

LIST OF REFERENCE SIGNS

1 Patch antenna device
2 Lower antenna layer
3 Substrate layer of the lower antenna layer
4 Upper metal layer of the lower antenna layer
5 Lower metal layer of the lower antenna layer
6 Middle antenna layer
7 Substrate layer of the middle antenna layer
8 Upper metal layer of the middle antenna layer
9 Lower metal layer of the middle antenna layer
10 Upper antenna layer
11 Substrate layer of the upper antenna layer
12 Upper metal layer of the upper antenna layer
13 Lower metal layer of the upper antenna layer
14 Feed pins for the middle antenna layer
15 First hollow pin
16 Second hollow pin
17 Feed pin for the upper antenna layer
18 Shorting pins
19 Feed points of the middle metal layer
20 Capacitive connections

21 Beveled corners
22 Feed point of the upper metal layer
23 U-slot
24 Cutouts
25 Shorting pins
26 Feed structure
27 Feed path
28 Feed path
28 Vehicle
29 Antenna housing
30 Antennas for cellular mobile radio

The invention claimed is:

1. A multi-layer patch antenna device comprising:
a lower antenna layer,
a middle antenna layer, and
an upper antenna layer,
wherein the antenna layers are arranged in a predetermined installation position in a manner stacked on top of each other from bottom to top,
the respective antenna layers comprise a respective dielectric substrate layer,
wherein an underside of the respective dielectric substrate layer is coated with a lower metal layer, and a top side of the respective dielectric substrate layer is coated with an upper metal layer,
the upper metal layer of the middle antenna layer is contacted by two feed pins which are guided through the lower and middle antenna layers,
the metal layers of the lower antenna layer are connected to each other via a first hollow pin which is guided through the lower dielectric substrate layer,
the metal layers of the middle antenna layer are connected via a second hollow pin which is guided through the middle dielectric substrate layer, and
the upper metal layer of the upper antenna layer is contacted by a further feed pin which is guided through the antenna layers and is coaxially sheathed by the first hollow pin and the second hollow pin.

2. The multi-layer patch antenna device as claimed in claim 1,
wherein the first hollow pin, the second hollow pin and the further feed pin are guided through an area center of the patch antenna device.

3. The multi-layer patch antenna device as claimed in claim 1,
wherein the two feed pins contact the upper metal layer of the middle antenna layer via capacitive connections.

4. The multi-layer patch antenna device as claimed in claim 1,
wherein the upper metal layer of the upper antenna layer comprises a rectangular basic structure, wherein two diagonally opposite corners of the rectangular structure are designed as beveled corners.

5. The multi-layer patch antenna device as claimed in claim 1,
wherein the metal layers of the upper antenna layer are connected via four shorting pins which are guided through the upper dielectric substrate layer.

6. The multi-layer patch antenna device as claimed in claim 1,
wherein the upper metal layer of the upper antenna layer has a U-slot arranged around a feed point of the upper metal layer of the upper antenna layer.

7. The multi-layer patch antenna device as claimed in claim 1,
wherein the dielectric substrate layer of the upper antenna layer has two cutouts which are arranged opposite feed points of the upper metal layer of the middle antenna layer by way of the feed pins.

8. A multi-layer patch antenna device, comprising:
a lower antenna layer,
a middle antenna layer, and
an upper antenna layer,
wherein the antenna layers are arranged in a predetermined installation position in a manner stacked on top of each other from bottom to top,
the respective antenna layers comprise a respective dielectric substrate layer,
wherein an underside of the respective dielectric substrate layer is coated with a lower metal layer, and a top side of the respective dielectric substrate layer is coated with an upper metal layer,
the upper metal layer of the middle antenna layer is contacted by two feed pins which are guided through the lower and middle antenna layers,
the metal layers of the lower antenna layer are connected to each other via a first hollow pin which is guided through the lower dielectric substrate layer,
the metal layers of the middle antenna layer are connected via a second hollow pin which is guided through the middle dielectric substrate layer,
the metal layers of the upper antenna layer are connected via shorting pins which are guided through the dielectric substrate layer of the upper antenna layer, and
the upper metal layer of the upper antenna layer is contacted by a further feed pin which is guided through the antenna layers and is coaxially sheathed by the first hollow pin and the second hollow pin.

9. The multi-layer patch antenna device as claimed in claim 8,
wherein the dielectric substrate layers have the same dielectric constant.

10. The multi-layer patch antenna device as claimed in claim 8,
wherein the dielectric substrate layers have different dielectric constants.

11. The multi-layer patch antenna device as claimed in claim 8,
wherein the upper metal layer of the upper antenna layer has a feed structure which is configured to supply a signal from a feed point of the upper metal layer of the upper antenna layer, via two feed paths of different path lengths, to a ring antenna structure of the upper metal layer of the upper antenna layer.

12. The multi-layer patch antenna device as claimed in claim 11,
wherein the ring antenna structure comprises two diagonally opposite beveled corners.

13. The multi-layer patch antenna device as claimed in claim 2,
wherein the two feed pins contact the upper metal layer of the middle antenna layer via capacitive connections.

14. The multi-layer patch antenna device as claimed in claim 13,
wherein the upper metal layer of the upper antenna layer comprises a rectangular basic structure, wherein two diagonally opposite corners of the rectangular structure are designed as beveled corners.

15. The multi-layer patch antenna device as claimed in claim 14,
wherein the metal layers of the upper antenna layer are connected via four shorting pins which are guided through the upper dielectric substrate layer.

16. The multi-layer patch antenna device as claimed in claim 15, wherein the upper metal layer of the upper antenna layer has a U-slot arranged around a feed point of the upper metal layer of the upper antenna layer.

17. The multi-layer patch antenna device as claimed in claim 16, wherein the dielectric substrate layer of the upper antenna layer has two cutouts which are arranged opposite feed points of the upper metal layer of the middle antenna layer by way of the feed pins.

18. The multi-layer patch antenna device as claimed in claim 10, wherein the upper metal layer of the upper antenna layer has a feed structure which is configured to supply a signal from a feed point of the upper metal layer of the upper antenna layer, via two feed paths of different path lengths, to a ring antenna structure of the upper metal layer of the upper antenna layer.

19. The multi-layer patch antenna device as claimed in claim 9, wherein the upper metal layer of the upper antenna layer has a feed structure which is configured to supply a signal from a feed point of the upper metal layer of the upper antenna layer, via two feed paths of different path lengths, to a ring antenna structure of the upper metal layer of the upper antenna layer.

20. The multi-layer patch antenna device as claimed in claim 19, wherein the ring antenna structure comprises two diagonally opposite beveled corners.

* * * * *